(12) United States Patent
Miyabe

(10) Patent No.: US 9,094,286 B2
(45) Date of Patent: Jul. 28, 2015

(54) TRANSMISSION DEVICE, TRANSMISSION METHOD, AND COMPUTER-READABLE RECORDING MEDIUM

(71) Applicant: FUJITSU LIMITED, Kawasaki-shi, Kanagawa (JP)

(72) Inventor: Masatake Miyabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 262 days.

(21) Appl. No.: 13/781,086

(22) Filed: Feb. 28, 2013

(65) Prior Publication Data

US 2013/0315104 A1 Nov. 28, 2013

(30) Foreign Application Priority Data

May 25, 2012 (JP) ................................. 2012-119784

(51) Int. Cl.
*H04L 12/28* (2006.01)
*H04L 12/751* (2013.01)
*H04L 12/753* (2013.01)

(52) U.S. Cl.
CPC ................ *H04L 45/02* (2013.01); *H04L 45/48* (2013.01)

(58) Field of Classification Search
None
See application file for complete search history.

(56) References Cited

U.S. PATENT DOCUMENTS

| 2004/0202271 | A1* | 10/2004 | Fahim ........................... 375/376 |
| 2007/0147562 | A1  | 6/2007  | Eidson |
| 2008/0068056 | A1* | 3/2008  | Poulton et al. ................ 327/156 |
| 2010/0271141 | A1* | 10/2010 | Hirai .............................. 331/34 |

FOREIGN PATENT DOCUMENTS

JP 2007-174680 A 7/2007

* cited by examiner

*Primary Examiner* — Minh-Trang Nguyen
(74) *Attorney, Agent, or Firm* — Arent Fox LLP

(57) ABSTRACT

A transmission device includes a memory which stores a program, and a processor which executes, based on the program, a procedure including calculating a difference between a first time when a frame is received by a first port which is in a blocked state and a second time when the frame is received by a second port which is not in a blocked state, and correcting a frame received after topology of a network is changed in accordance with states of the first and second ports after the topology is changed and the difference.

15 Claims, 10 Drawing Sheets

TRANSMISSION DEVICE, TRANSMISSION METHOD, AND COMPUTER-READABLE RECORDING MEDIUM

CROSS-REFERENCE TO RELATED APPLICATION

This application is based upon and claims the benefit of priority from the prior Japanese Patent Application No. 2012-119784 filed on May 25, 2012, the entire contents of which are incorporated herein by reference.

FIELD

The embodiments discussed herein are related to a transmission device, a transmission method, and a computer-readable recording medium.

BACKGROUND

In recent years, Ethernet (registered trademark) has been used in not only LANs (Local Area Networks) but also carrier networks as an infrastructure technique which supports packet networks. Therefore, Ethernet (registered trademark) has been used in data communication and has also been used in communication which is sensitive to variation of transmission delay and data loss in transmission such as transmission of audio and moving images. When the communication which is sensitive to variation of transmission delay and data loss in transmission is performed, monitoring of transmission quality is important. As an elemental technology of monitoring transmission quality, a time synchronization protocol and a PTP (Precision Time Protocol) which are prescribed in the IEEE1588 have been used. Devices which execute the PTP operate as masters or slaves. A PTP master has a master clock which supplies a clock for time synchronization to a network. A PTP slave has a slave clock which is synchronized with the master clock. The PTP slave detects a time difference between the master clock and the slave clock and attains time synchronization so as to maintain time synchronization in the network. Furthermore, the PTP slave detects a difference between an operation frequency of the master clock and an operation frequency of the slave clock so that the operation frequency of the slave clock coincides with that of the master clock. The related art is disclosed in Japanese Laid-open Patent Publication No. 2007-174680.

SUMMARY

According to an aspect of the invention, a transmission device includes a memory which stores a program, and a processor which executes, based on the program, a procedure including calculating a difference between a first time when a frame is received by a first port which is in a blocked state and a second time when the frame is received by a second port which is not in a blocked state, and correcting a frame received after topology of a network is changed in accordance with states of the first and second ports after the topology is changed and the difference.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
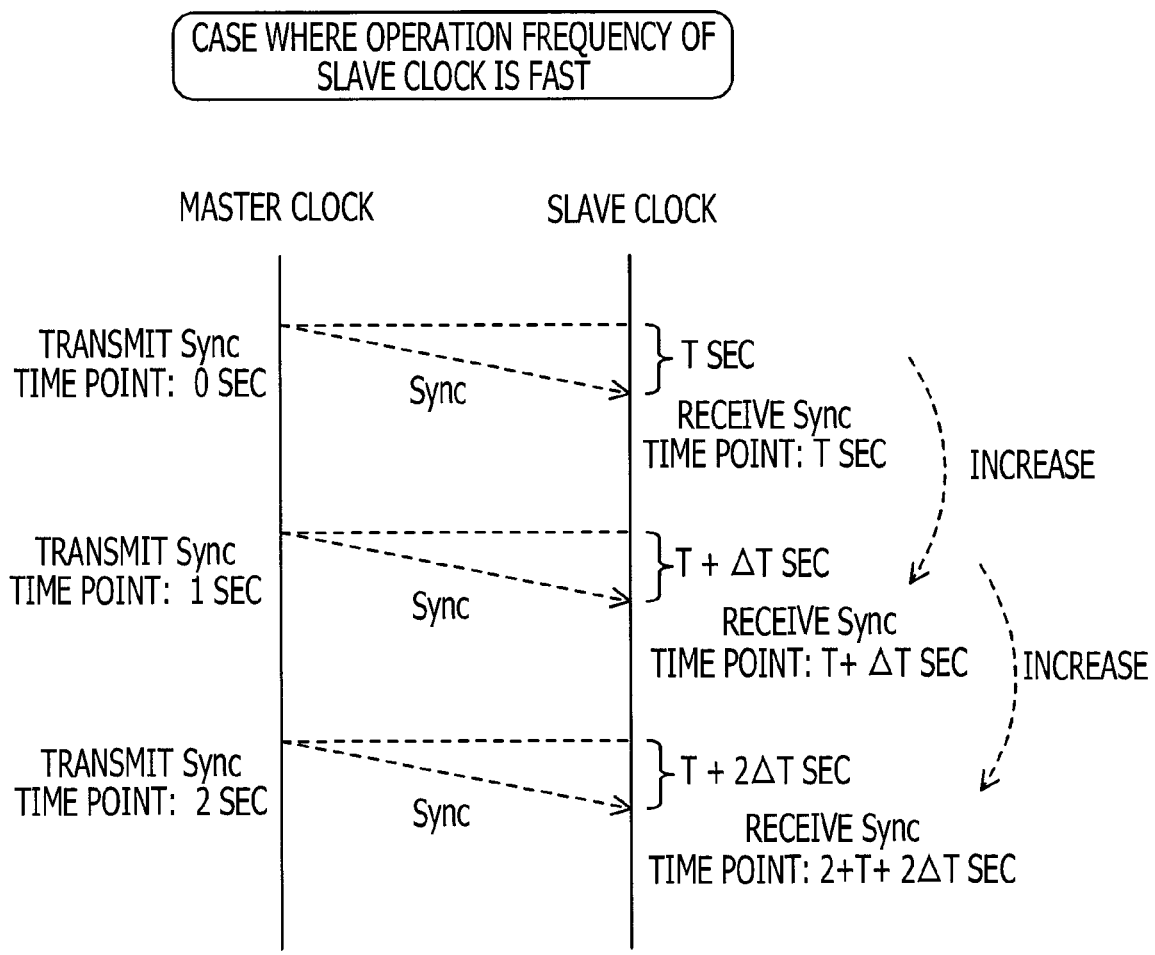
FIG. 1 is a diagram illustrating variation of a difference between a time point when a time synchronization message is received and a time point when the time synchronization message is transmitted in a case where an operation frequency of a slave clock is faster than an operation frequency of a master clock.
Figure 2:
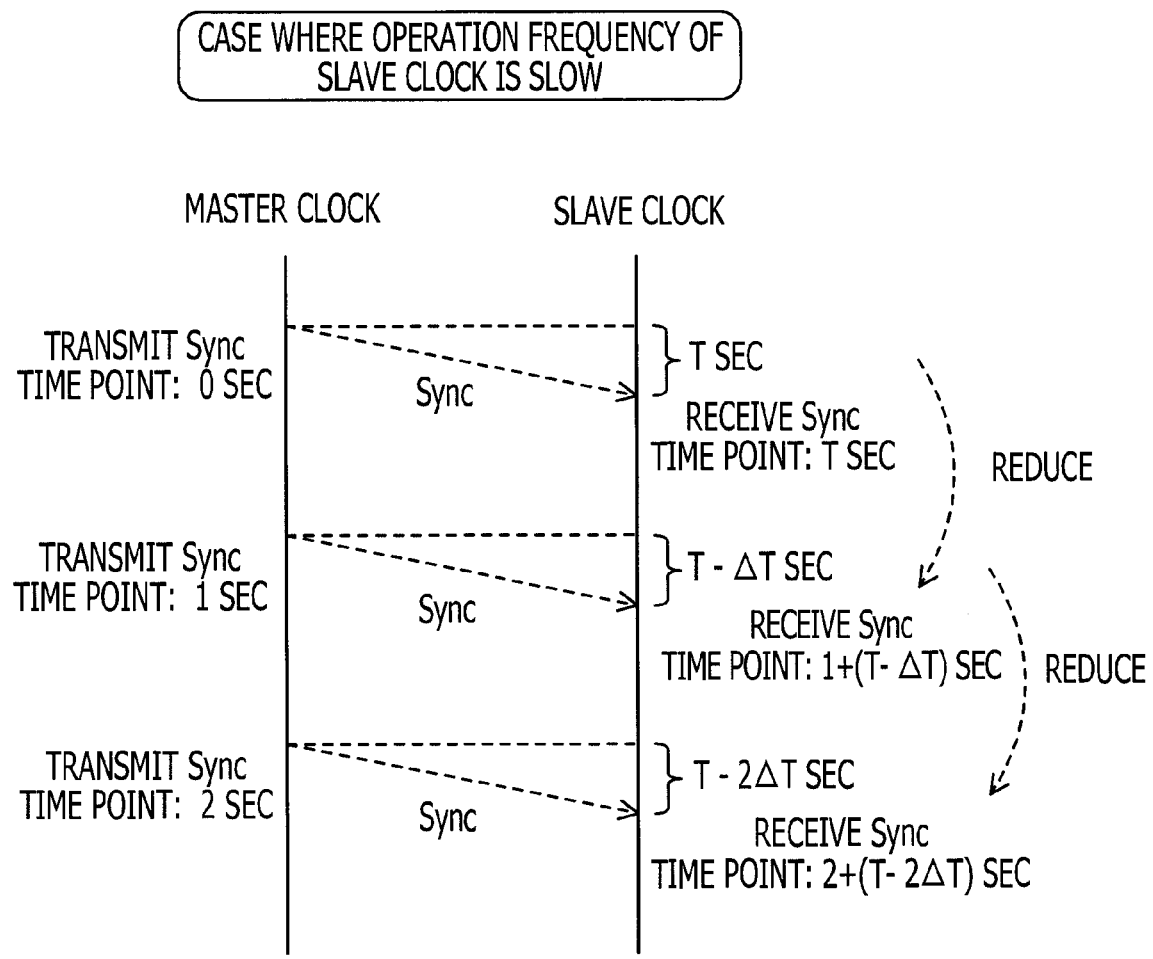
FIG. 2 is a diagram illustrating variation of a difference between a time point when a time synchronization message is received and a time point when the time synchronization message is transmitted in a case where the operation frequency of the slave clock is slower than the operation frequency of the master clock.

First, discussion by the inventor will be summarized. FIGS. 1 and 2 are diagrams used to describe a detection of a difference between an operation frequency of a master clock and an operation frequency of a slave clock. FIG. 1 is a diagram illustrating variation of a difference between a time point when a time synchronization message is received and a time point when the time synchronization message is transmitted in a case where the operation frequency of the slave clock is faster than the operation frequency of the master clock. FIG. 2 is a diagram illustrating variation of a difference between a time point when a time synchronization message is received and a time point when the time synchronization message is transmitted in a case where the operation frequency of the slave clock is slower than the operation frequency of the master clock. Note that in the examples of FIGS. 1 and 2, at a time point 0, a clock which is included in a PTP master and a clock which is included in a PTP slave indicate the same time point.

In the IEEE1588, the PTP master periodically transmits a time synchronization message which is referred to as a sync message to the PTP slave in a multicast manner. The PTP master measures a time point when the sync message is transmitted using the clock included in the PTP master and transmits a result of the measurement which is stored in the sync message to the PTP slave. The PTP slave measures a time point when the sync message is received using the clock included in the PTP slave and calculates a difference between the reception time point and the transmission time point transmitted from the PTP master. It is assumed that, in FIGS. 1 and 2, the sync message is transmitted through the same route and variation of transmission delay does not occur or is negligible.

First, a case where the operation frequency of the slave clock is faster than that of the master block illustrated in FIG. 1 will be discussed. It is assumed that the operation frequency of the slave clock advances by ΔT per one second relative to the operation frequency of the master clock. A sync message transmitted from the PTP master at the time point 0 second measured by the clock of the PTP master is received by the PTP slave at a time point T seconds measured by the clock of by the PTP slave, for example. In this case, a difference between the reception time point and the transmission time point of the sync message is T seconds. Next, a sync message transmitted from the PTP master at a time point 1 second measured by the clock of the PTP master is received by the PTP slave at a time point 1+T+ΔT seconds measured by the clock of the PTP slave, for example. Since the slave clock is faster than the master clock, a difference between the reception time point and the transmission time point of the sync message is T+ΔT seconds which is larger than T seconds by ΔT seconds, for example. Furthermore, a sync message transmitted from the PTP master at a time point 2 seconds measured by the clock of the PTP master is received by the PTP slave at a time point 2+T+2ΔT seconds measured by the clock of the PTP slave, for example. In this case, a difference between the reception time point and the transmission time point of the sync message is further increased to T+2ΔT seconds. As described above, when the operation frequency of the slave clock is faster than that of the master clock, a difference between a measured reception time point and a measured transmission time point of the sync message becomes large as time advances.

Next, a case where the operation frequency of the slave clock is slower than that of the master block illustrated in FIG. 2 will be discussed. It is assumed that the operation frequency of the slave clock delays by ΔT per one second relative to the operation frequency of the master clock. A sync message transmitted from the PTP master at a time point 0 second measured by the clock of the PTP master is received by the PTP slave at a time point T seconds measured by the clock of the PTP slave, for example. In this case, a difference between the reception time point and the transmission time point of the sync message is T seconds. Next, a sync message transmitted from the PTP master at a time point 1 second measured by the clock of the PTP master is received by the PTP slave at a time point 1+T−ΔT seconds measured by the clock of the PTP slave, for example. In this case, since the slave clock is slower than the master clock, a difference between the reception time point and the transmission time point of the sync message is reduced to T−ΔT seconds, for example. Furthermore, a sync message transmitted from the PTP master at a time point 2 seconds measured by the clock of the PTP master is received by the PTP slave at a time point 2+(T−2ΔT) seconds measured by the clock of the PTP slave, for example. In this case, a difference between the reception time point and the transmission time point of the sync message is further reduced to T−2ΔT seconds, for example. As described above, when the operation frequency of the slave clock is slower than that of the master clock, a difference between a measured reception time point and a measured transmission time point of the sync message gradually becomes small.

As illustrated in FIGS. 1 and 2, in the IEEE1588 standard, a difference between the operation frequency of the master clock and the operation frequency of the slave clock may be detected by variation of the difference between a reception time point and a transmission time point of a sync message.

Meanwhile, in an Ethernet network, forwarding loop invites serious failure. However, it is important for the network to include a redundant route in order to attain fault tolerance. As a method for inhibiting generation of a loop while the redundancy is ensured and the fault tolerance is attained, a spanning tree protocol (STP) (IEEE std 802.1D-1998), a rapid scanning tree protocol (RSTP) (IEEE std 802.1D-2004), or a multiple scanning tree protocol (MSTP) (IEEE std 802.1Q-2005) is used. Each of these protocols forms active topology without a loop in a network by blocking a port of a device included in a loop in the network. Note that a state in which a port is blocked represents a state in which a frame is not forwarded to the port and a received frame is not forwarded but discarded.

When a time synchronization message is transmitted in an Ethernet network in which the STP, the RSTP, or the MSTP operates and when active topology is changed due to occurrence of failure or the like, a route of the transmission of the time synchronization message may be changed. It is likely that a difference between a reception time point and a transmission time point of the time synchronization message varies due to the change of the transmission route of the time synchronization message, and accordingly, the slave clock mistakenly recognizes a difference between the operation frequency of the slave clock and the operation frequency of the master clock.

Figure 3:
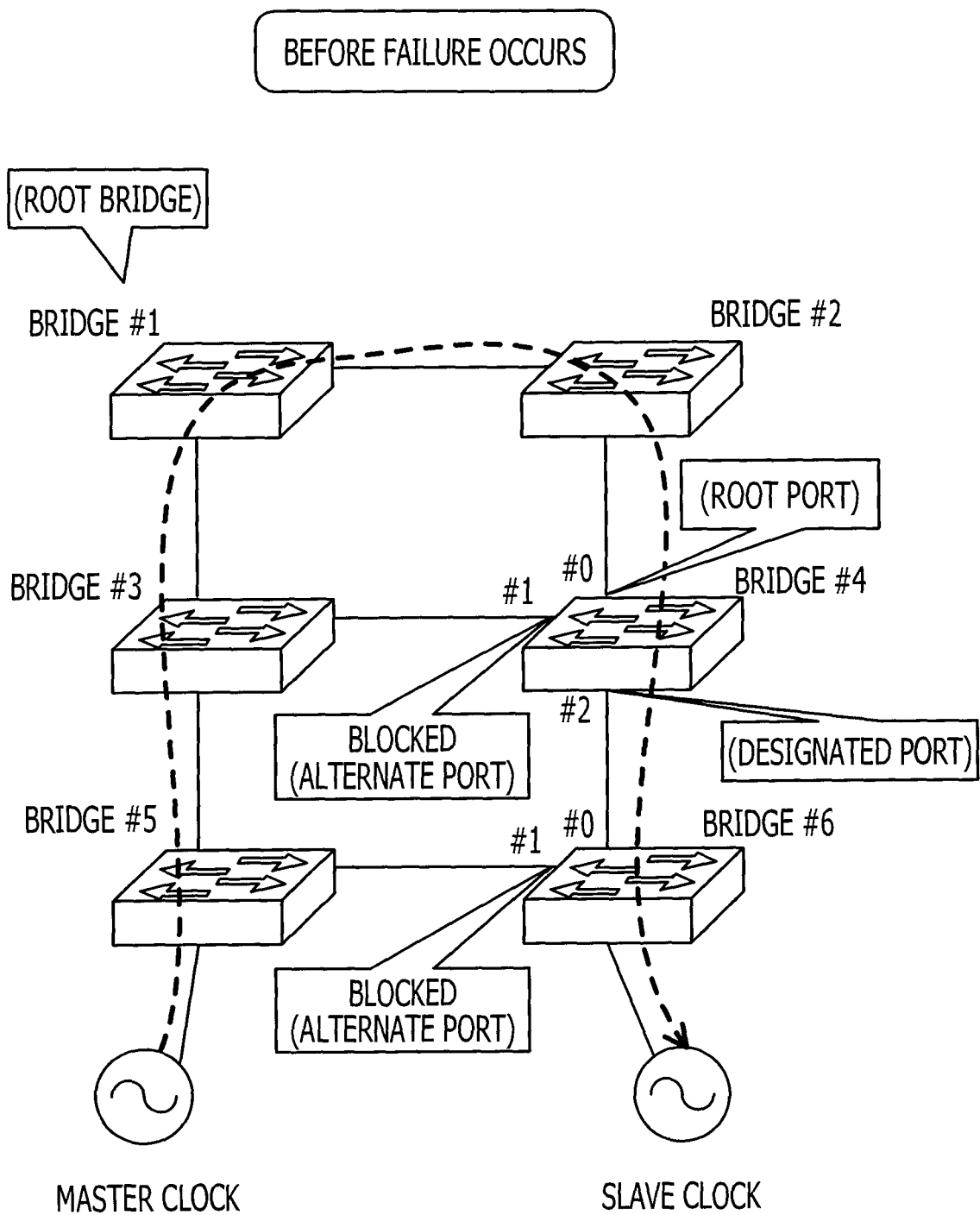
FIG. 3 is a diagram illustrating a network before failure occurs.
Figure 4:
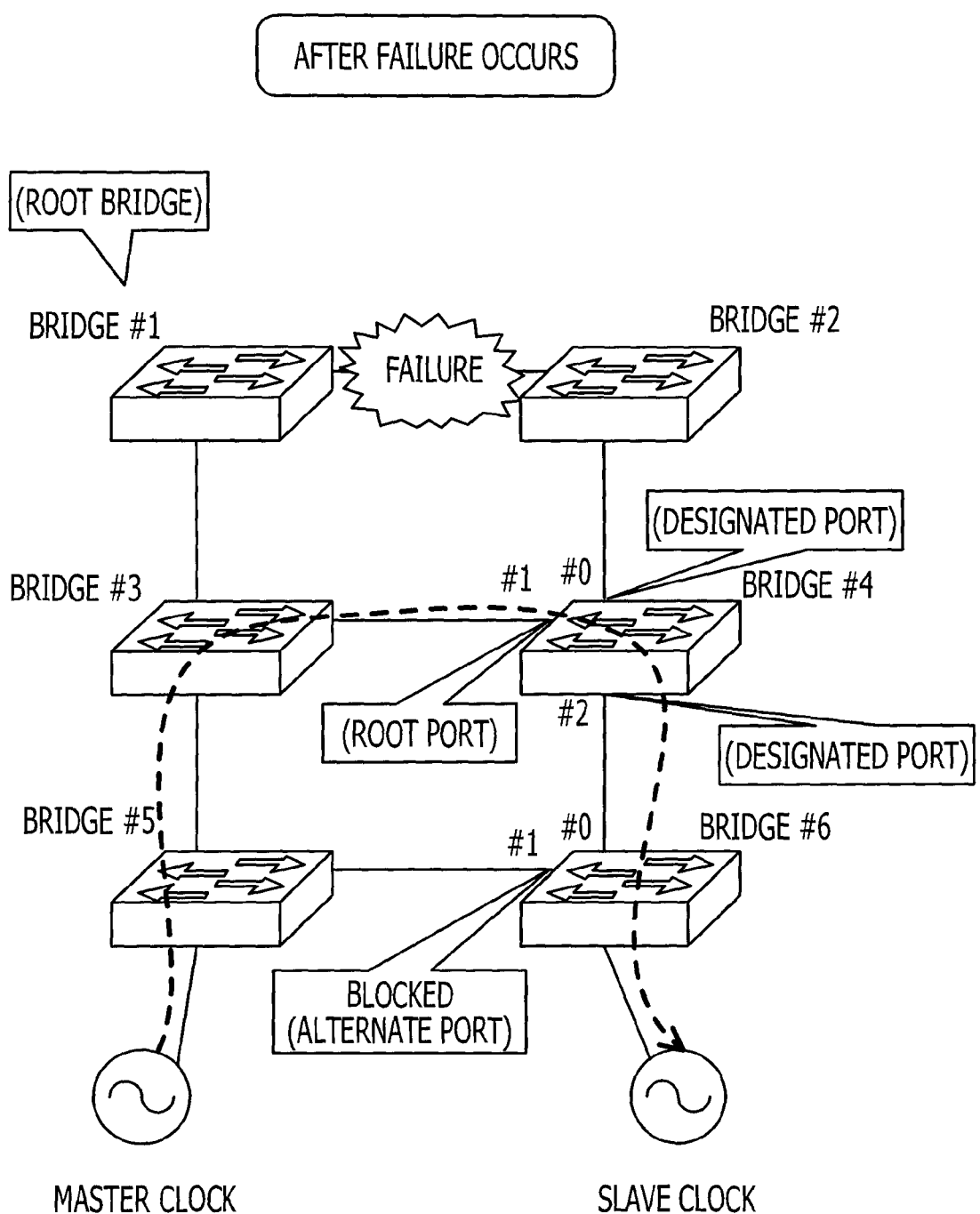
FIG. 4 is a diagram illustrating the network after failure occurs.

FIGS. 3 and 4 are diagrams illustrating change of a route of a time synchronization message when failure occurs. In FIGS. 3 and 4, the same Ethernet network is illustrated, and in the Ethernet network, the RSTP is executed. Furthermore, a PTP master is coupled to a fifth bridge and a PTP slave is coupled to a sixth bridge.

FIG. 3 is a diagram illustrating the network before failure occurs. A first port of a fourth bridge and a first port of the sixth bridge are blocked by the RSTP. By this, generation of a forwarding loop is inhibited. In active topology illustrated in FIG. 3, a sync message supplied from the PTP master arrives at the PTP slave through the fifth bridge, a third bridge, a first bridge, a second bridge, the fourth bridge, and the sixth bridge in this order.

In the network illustrated in FIG. 3, when failure occurs in a path between the first and second bridges, the network is divided into a portion including the first, third, and fifth bridges and a portion including the second, fourth, and sixth bridges. In this case, when the devices detect the occurrence of the failure, the RSTP is calculated again by the bridges, the blocking of one of the ports is cancelled, and new active topology is formed.

FIG. 4 is a diagram illustrating the network after the failure occurs. As a result of the recalculation of the RSTP, the blocking of the first port of the fourth bridge is cancelled as illustrated in FIG. 4, for example. By this, the sync message transmitted from the PTP master arrives at the PTP slave through the fifth, third, fourth, and sixth bridges in this order. As a result, since the route of the sync message before the failure occurs and the route of the sync message after the failure occurs are different from each other, transmission delay of the sync message varies. The variation of the transmission delay of the sync message affects variation of a difference between a reception time point of the sync message in the PTP slave and a transmission time point of the sync message in the PTP master. Therefore, the PTP slave may mistakenly recognize a difference between the operation frequency of the slave clock and the operation frequency of the master clock.

Hereinafter, embodiments of the present disclosure will be described with reference to the accompanying drawings.

Configurations of the embodiments described below are merely examples and the present disclosure is not limited to the configurations of the embodiments.

In this embodiment, a network includes a plurality of transmission devices each of which executes a loop avoidance protocol (the STP, the RSTP, the MSTP, or the like). Any transmission device may be used as long as the transmission device is a layer 2 switch or a bridge capable of executing the loop avoidance protocol. When the network includes a transmission device which executes the STP and a transmission device which executes the RSTP, the STP is executed in the entire network. In a first embodiment, in a network, a difference between transmission delay of a time synchronization message in a route before topology is changed and transmission delay of the time synchronization message in a route after the topology is changed is measured in advance. After the topology is changed, the difference between the transmission delay of the time synchronization message before the topology is changed and the transmission delay of the time synchronization message after the topology is changed is corrected using the measured difference. The change of the topology is performed due to occurrence of failure in a transmission path or a port or change of connection instructed by a user.

Figure 5:
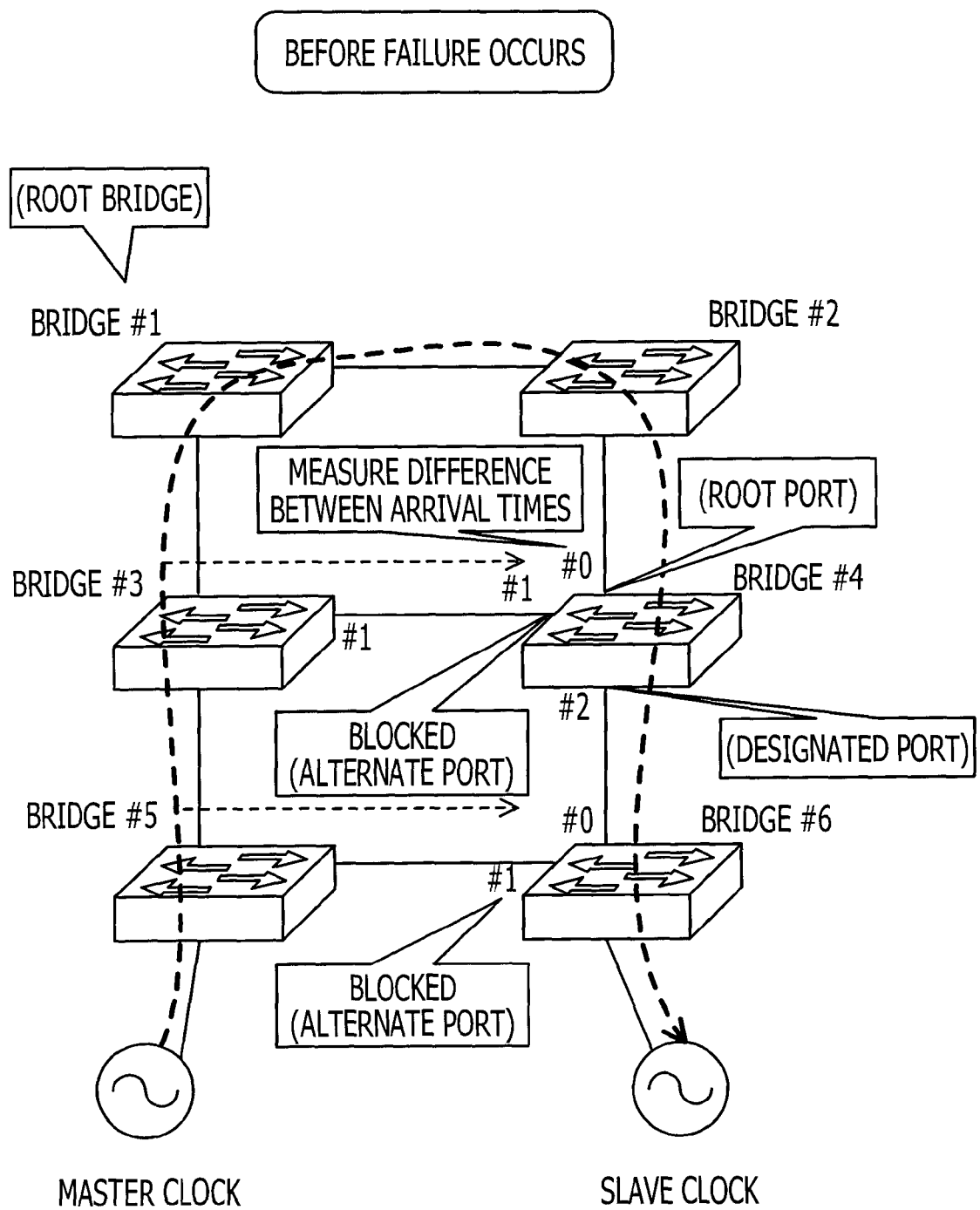
FIG. 5 is a diagram illustrating another network before failure occurs.
Figure 6:
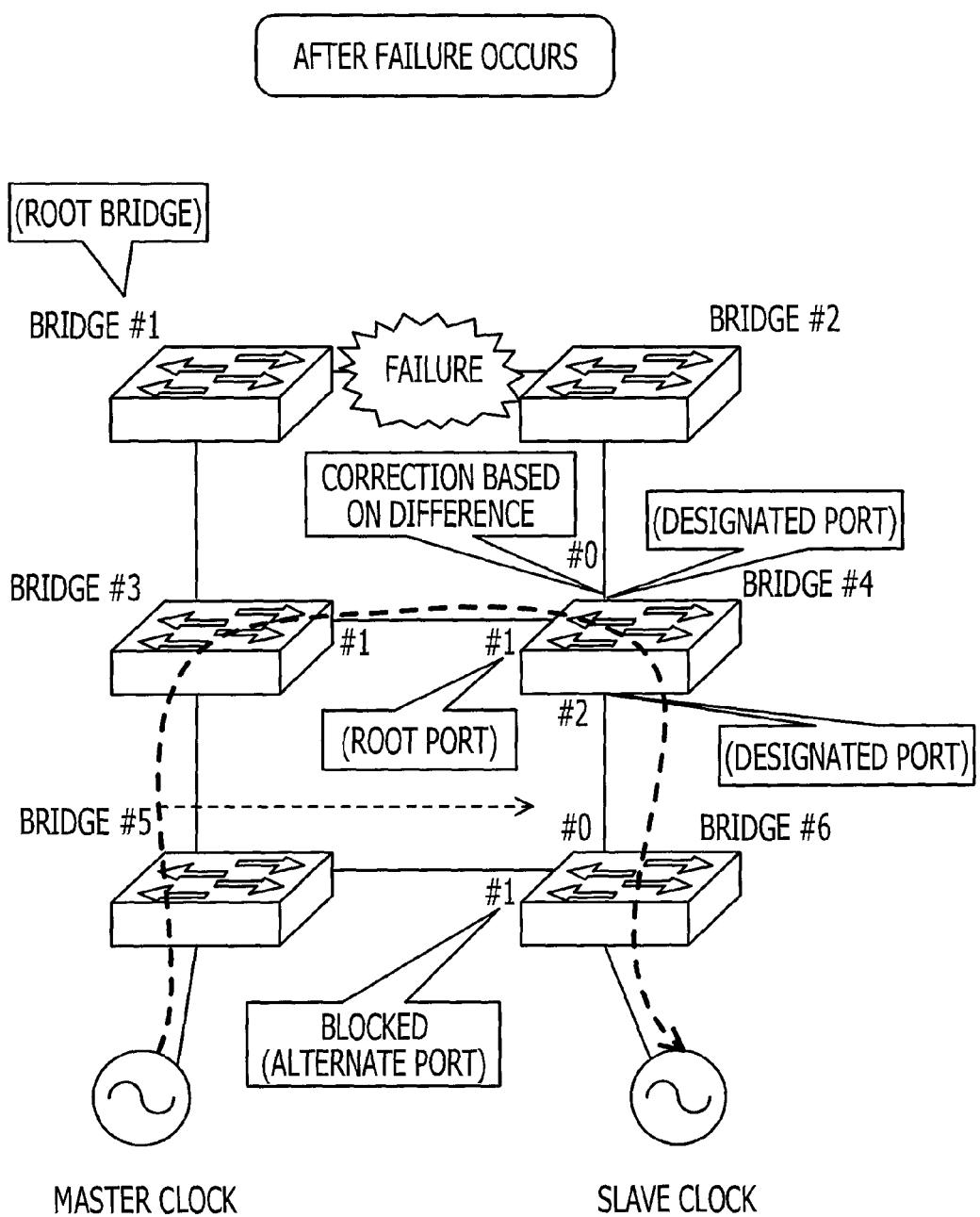
FIG. 6 is a diagram illustrating the network of FIG. 5 after failure occurs in a transmission path between a first bridge and a second bridge.

FIGS. 5 and 6 are diagrams illustrating a method for correcting transmission delay of a time synchronization message performed when topology is changed in the network according to the first embodiment. FIGS. 5 and 6 illustrate the same network. In FIGS. 5 and 6, a case where failure occurs in a transmission path will be described as an example of change of topology. FIG. 5 is a diagram illustrating the network before failure occurs. FIG. 6 is a diagram illustrating the network after failure occurs. The network illustrated in FIGS. 5 and 6 is an Ethernet network which includes a plurality of bridges. Furthermore, in the network illustrated in FIGS. 5 and 6, the RSTP is executed in the bridges. In FIGS. 5 and 6, a PTP master clock is coupled to a fifth bridge and a PTP slave clock is coupled to a sixth bridge.

First, a process of determining roles of ports in the STP which is a basic loop avoidance protocol will be described. The STP is a predecessor of the RSTP, and the process of determining roles of ports in the STP is similar to that in the RSTP in a number of portions. In the STP, the transmission devices transmit and receive a frame referred to as a BPDU (Bridge Protocol Data Unit) so that a transmission device serving as a root of a tree structure (root bridge) and roles of ports of the transmission devices are determined. The BPDU includes a bridge ID of the root bridge, a bridge ID of a transmission device which is a transmission source of the BPDU, a path cost to the root bridge, and a port ID of a port from which the BPDU is transmitted. The bridge ID is a value of eight bytes and the transmission devices have respective bridge IDs set in advance. The path cost represents a virtual distance to the root bridge and a sum of values determined in accordance with link speeds of transmission paths coupled to the ports to the root bridge. The port ID is a value of two bytes and individual ports have respective ports IDs set in advance. Hereinafter, a determination of a root bridge and roles of the ports of the transmission devices is referred to as a calculation of the STP.

In the examples illustrated in FIGS. 5 and 6, the link speeds of the transmission paths between the bridges are the same as one another, and path costs are also the same as one another. Furthermore, large or small of the bridge IDs is represented by numbering of the bridges. For example, in the network illustrated in FIGS. 5 and 6, large or small of the bridge IDs is represented as follows: First Bridge<Second Bridge<Third Bridge<Fourth Bridge<Fifth Bridge<Sixth Bridge. Hereinafter, calculations of the STP and the RSTP will now be described taking the network illustrated in FIG. 5 as an example.

(1) The transmission devices generate BPDUs and exchange the generated BPDUs with one another. Bridge IDs included in the BPDUs are compared with one another so that one of the transmission devices which has the smallest bridge ID is determined as a root bridge. Note that the bridge IDs are not overlapped with one another among the transmission devices since the bridge IDs include respective MAC addresses, and therefore, only one root bridge is determined in one network. Since the first bridge has the smallest bridge ID in the network illustrated in FIG. 5, the first bridge is determined as a root bridge.

(2) Each of the transmission devices calculates path costs from ports to the root bridge using the BPDUs received by the ports.

(3) In each of the transmission devices, one of the ports which is closest to the root bridge is determined as a root port (RP). One of the ports which has the smallest path cost, the smallest bridge ID, or the smallest port ID is determined as a root port in this priority order. One root port is determined in one transmission device.

In the network illustrated in FIG. 5, the link speeds of the transmission paths between the bridges are the same as one another. Therefore, in the fourth bridge, for example, path costs of a zeroth port and a first port are the smallest. When the root port is not determined according to path costs, the root port is determined according to bridge IDs of transmission devices located in higher levels of the ports. A transmission device located in a higher level of the zeroth port of the fourth bridge is the second bridge. A transmission device located in a higher level of the first port of the fourth bridge is the third bridge. Accordingly, in the fourth bridge, the zeroth port coupled to the transmission device in a higher level which has the smaller bridge ID is determined as a root port.

(4) By exchanging the BPDUs, ports which are closest to the root bridge in individual segments are determined as designated ports (DPs). The term "segments" represents portions of the network divided by the transmission devices. One of the ports which has the smallest path cost, the smallest bridge ID, or the smallest port ID is determined as the designated port in this priority order. One designated port is determined in one segment.

In the network illustrated in FIG. 5, a segment defined by the fourth and sixth bridges includes a second port of the fourth bridge and a zeroth port of the sixth bridge, for example. Since the link speeds of the transmission paths between the bridges are the same as one another, a path cost of the second port of the fourth bridge is smaller than that of the zeroth port of the sixth bridge. Therefore, in the segment defined by the fourth and sixth bridges, the second port of the fourth bridge is determined as a designated port.

Furthermore, a segment defined by the fourth and third bridges includes a first port of the third bridge and a first port of the fourth bridge, for example. Since the link speeds of the transmission paths between the bridges are the same as one another, a path cost of the first port of the third bridge is smaller than that of the first port of the fourth bridge. Therefore, in the segment defined by the fourth and third bridges, the first port of the third bridge is determined as a designated port.

(5) The other ports are determined as non-designated ports (NDPs). A spanning tree is formed by blocking the non-designated ports. For example, in the fourth bridge in the network illustrated in FIG. 5, the first port is neither selected as a root port nor a designated port but determined as a non-designated port. Therefore, the first port of the fourth bridge is blocked and the calculation of the STP is terminated.

In a case of the RSTP, non-designated ports which are blocked in the STP are further divided into alternate ports and backup ports. As with the case of the non-designated ports of the STP, the alternate ports and the backup ports are also blocked.

It is not necessarily the case that the blocked ports do not receive frames. For example, the blocked ports receive multicast frames and broadcast frames. Frames which have received by the blocked ports are discarded without being forwarded to other ports.

FIG. 6 is a diagram illustrating the network of FIG. 5 after failure occurs in the transmission path between the first bridge and the second bridge. In the network of FIG. 6, the recalculation of the RSTP performed in accordance with the change of the topology caused by occurrence of failure is terminated. Also in the network after the failure occurs illustrated in FIG. 6, the root bridge is not changed, that is, the first bridge corresponds to the root bridge. Furthermore, the first port of the fourth bridge which is blocked before the failure occurs is changed to a root port and the blocking is cancelled, that is, a role of the first port of the fourth bridge is changed. The second port of the fourth bridge is selected as the designated port even after the failure occurs. The first port of the sixth bridge is blocked even after the failure occurs.

In the network illustrated in FIG. 5, a time synchronization message supplied from the PTP master arrives at the PTP slave through the fifth bridge, the third bridge, the first bridge, the second bridge, the fourth bridge, and the sixth bridge in this order. On the other hand, in the network after the failure occurs illustrated in FIG. 6, a time synchronization message supplied from the PTP master arrives at the PTP slave through the fifth bridge, the third bridge, the fourth bridge, and the sixth bridge in this order. When the routes of the time synchronization messages before and after the failure occurs are compared with each other, the route before the failure occurs and the route after the failure occurs are separated from each other at the third bridge and join together again at the fourth bridge.

In the fourth bridge in the network before the failure occurs illustrated in FIG. 5, since the time synchronization message is transmitted in a multicast manner, the time synchronization message arrives at the blocked first port (non-designated port) in addition to the zeroth port (root port) included in the active topology. For example, in the fourth bridge which is a junction point of the route before the failure occurs and the route after the failure occurs, the time synchronization message is received before the failure occurs by the first port which serves as the root port after the failure occurs and which is included in the route of the time synchronization message after the failure occurs. Therefore, a difference between transmission delay of the time synchronization message before the failure occurs and transmission delay of the time synchronization message after the failure occurs may be estimated by measuring a difference between an arrival time of the time synchronization message at the zeroth port (root port) of the fourth bridge and an arrival time of the time synchronization message at the first port (blocked state) of the fourth bridge in the network before the failure occurs.

Furthermore, in the fourth bridge which is the junction point of the routes before and after the failure occurs, the second port remains as the designated port even after the failure occurs and the time synchronization message is transferred to the second port.

Accordingly, in the first embodiment, the fourth bridge measures and stores a difference between the arrival time of the synchronization message at the zeroth port (root port) and the arrival time of the synchronization message at the blocked first port included in the active topology in the network before the failure occurs in advance, for example (FIG. 5). After the failure occurs, the fourth bridge detects transfer of the time synchronization message from the first port which has been blocked but is determined as the root port after the failure occurs to the second port determined as the designated port even before and after the failure occurs. In this case, the fourth bridge corrects the time synchronization message newly received by the first port determined as the root port in which the block state is cancelled after the failure occurs using the difference measured in advance (FIG. 6). The correction of the time synchronization message may be performed in a method for adding the difference of the arrival times of the time synchronization message measured in advance to a value of a correction field included in a header of the time synchronization message, a method for delaying the time synchronization message by the difference between the arrival times, or the like.

Figure 7:
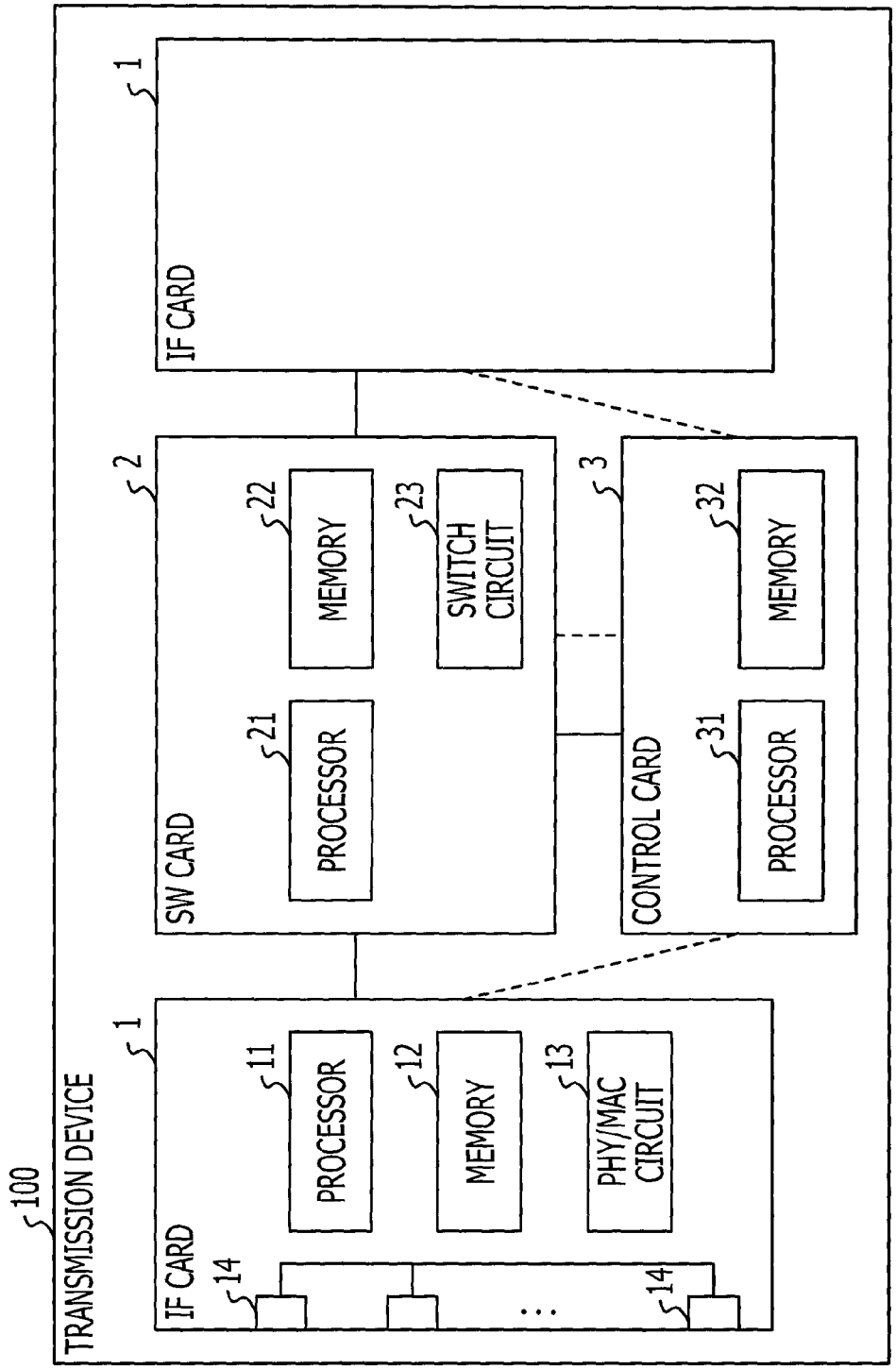
FIG. 7 is a diagram illustrating a hardware configuration of a transmission device.

FIG. 7 is a diagram illustrating a hardware configuration of each of the transmission devices. The transmission devices which are layer 2 switches or bridges, for example, are capable of executing the loop avoidance protocol. A transmission device 100 includes a plurality of IF cards 1, an SW card 2 which relays a frame between the IF cards 1, and a control card 3 which performs control of the cards included in the transmission device 100.

Each of the IF cards 1 includes a processor 11, a memory 12, a PHY/MAC (PHYsical layer MAC layer) circuit 13, and a plurality of ports 14. The ports 14 are coupled to the PHY/MAC circuit 13. The processor 11, the memory 12, and the PHY/MAC circuit 13 are coupled to one another through a bus (not shown).

The PHY/MAC circuit 13 performs a termination process on frames supplied from the ports 14 in a physical layer and a termination process on the frames supplied from the ports 14 in a MAC layer. The memory 12 includes a volatile memory such as an SRAM (Static Random Access Memory) or a DRAM (Dynamic Random Access Memory) and a nonvolatile memory such as a PROM (Programmable Read Only Memory). In the memory 12, various programs and various data used for frame transfer are stored.

The processor 11 corresponds to a CPU (Central Processing Unit) or an NPU (Network Processing Unit), for example. The processor 11 executes the programs stored in the memory 12 and performs a process of transferring various frames.

As with the IF cards 1, the SW card 2 and the control card 3 include respective processors 21 and 31 and respective memories 22 and 32. The SW card 2 includes the memory 22 which stores a MAC address table used for the frame transfer and the like. The SW card 2 includes a switch circuit 23. The switch circuit 23 refers to the MAC address table stored in the memory 22 at the time of frame transfer and relays a frame between the IF cards 1.

The components included in the IF cards 1, the SW card 2, and the control card 3 may be configured as individual devices or individual chips or may be configured as a single LSI (Large Scale Integration) or a plurality of LSIs. Furthermore, the hardware configuration of the IF cards 1, the SW card 2, and the control card 3 is not limited to the configuration illustrated in FIG. 7. An FPGA (Field Programmable Gate Array), an IC logic element, or the like may be additionally included in the configuration illustrated in FIG. 7, for example. Furthermore, the IF cards 1, the SW card 2, and the control card 3 may include the single processor 11, the single processor 21, and the single processor 31, respectively, or may include a plurality of processors 11, a plurality of processors 21, and a plurality of processors 31, respectively, for distributed processing.

Figure 8:
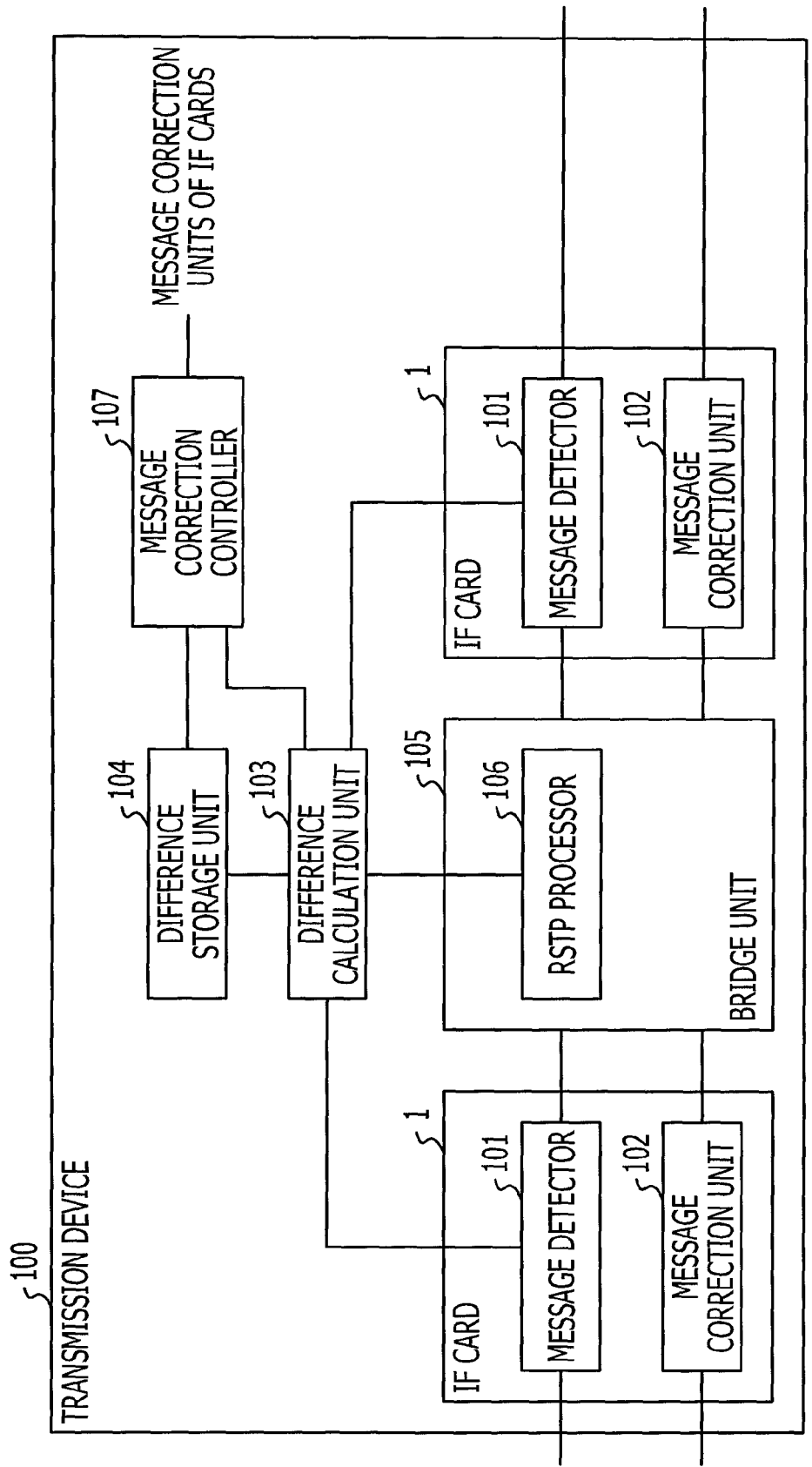
FIG. 8 is a functional block diagram illustrating the transmission device.

FIG. 8 is a functional block diagram illustrating the transmission device 100. The transmission device 100 includes a message detector 101, a message correction unit 102, a difference calculation unit 103, a difference storage unit 104, a bridge unit 105, an RSTP processor 106, and a message correction controller 107. The message detector 101 and the message correction unit 102 are realized by an electric or electronic circuit, an FPGA, or the like included in each of the IF cards 1. Furthermore, the message detector 101 and the message correction unit 102 are included in each of the IF cards 1. The bridge unit 105 corresponds to the switch circuit 23 included in the SW card 2. The RSTP processor 106 is realized by a software process performed by the processor 21 included in the SW card 2. The difference calculation unit 103, the difference storage unit 104, and the message correction controller 107 may be included in the SW card 2 or the control card 3. For example, the difference calculation unit 103 and the message correction controller 107 are realized by software processes performed by the processor 21 of the SW card 2 and the difference storage unit 104 corresponds to the memory 22 of the SW card 2. Furthermore, for example, the difference calculation unit 103 and the message correction controller 107 are realized by software processes performed by the processor 31 of the control card 3 and the difference storage unit 104 corresponds to the memory 32 of the control card 3.

The message detector 101 detects a time synchronization message from a frame received by one of the IF cards 1. The time synchronization message is detected when an Ethertype value included in the frame coincides with a value representing the time synchronization message (88F7 in hexadecimal notation) or when a value of a port number included in a header coincides with a value representing the time synchronization message (UDP319), for example. The message detector 101 adds an identifier of a detected port to the detected time synchronization message and outputs the resultant time synchronization message to the difference calculation unit 103 and the bridge unit 105.

The bridge unit 105 relays the frame supplied from one of the IF cards 1 to the other IF card 1 serving as an output destination. The bridge unit 105 reads a destination MAC address included in the frame, reads an identifier of one of the IF cards 1 and an identifier of a port serving as an output destination of the frame with reference to the MAC address table, and transfers the frame to one of the IF cards 1 serving as the output destination.

The RSTP processor 106 executes the calculation of the RSTP in accordance with a BPDU supplied from the bridge unit 105 and determines roles of the individual ports. The RSTP processor 106 notifies the difference calculation unit 103 and the message correction controller 107 of the roles of the ports.

The roles of the ports are supplied from the RSTP processor 106 to the difference calculation unit 103 and the time synchronization message is supplied from the message detector 101 of one of the IF cards 1 to the difference calculation unit 103. The difference calculation unit 103 calculates a difference value of reception time points when detecting that the same time synchronization message is received in a root port and a blocked port (an alternate port and a backup port in the case of the RSTP). The difference value of reception time points of the time synchronization message is obtained by subtracting a reception time point of the blocked port from a reception time point of the root port, for example. When the time synchronization message arrives at the root port before the blocked port, the difference value represents a negative value. When the time synchronization message arrives at the blocked port before the root port, the difference value represents a positive value. The reception time points of the time synchronization message are assigned to the time synchronization message by the message detector 101 of one of the IF cards 1 which has received the time synchronization message, for example. Furthermore, the same time synchronization message is detected by a sequence number included in a header of the time synchronization message. The difference between the reception time points of the time synchronization message calculated by the difference calculation unit 103 is stored in the difference storage unit 104. The difference calculation unit 103 is an example of a "calculation unit".

The message correction controller 107 receives the roles of the ports from the RSTP processor 106. When the recalculation of the RSTP is executed due to change of the topology, the message correction controller 107 determines whether correction of the time synchronization message is to be performed. For example, the message correction controller 107 determines that the correction of the time synchronization message is to be performed when the blocked port is selected as a root port by the recalculation of the RSTP and a certain port is selected as a designated port before and after the recalculation of the RSTP. The message correction controller 107 instructs the message correction unit 102 of one of the IF cards 1 which has the designated port to perform the correction of the time synchronization message when determining that the correction of the time synchronization message is to be performed. A transmission source port of the time synchronization message to be corrected included in the device (a port selected as the root port after the failure occurs) and a destination port (a port selected as the designated port before and after the failure occurs) may be included in the instruction issued by the message correction controller 107. The message correction controller 107 is an example of a "determination unit".

The message correction unit 102 is included in each of the IF cards 1. The frame transferred by the bridge unit 105 is supplied to the message correction unit 102. When receiving an instruction for correcting the time synchronization message from the message correction controller 107, the message correction unit 102 starts monitoring of a frame output from the designated port of the own IF card 1. The message correction unit 102 corrects the time synchronization message when the time synchronization message is transferred from the port selected as the root port after the failure occurs to the designated port of the own IF card 1. The time synchronization message transferred from the port selected as the root port after the failure occurs to the designated port of the own IF card 1 is detected by means of a port identifier assigned by the message detector 101 of the IF card1 which has received the time synchronization message, for example. The message correction unit 102 removes the port identifier assigned by the message detector 101 from the corrected time synchronization message and outputs the time synchronization message. The message correction unit 102 is an example of a "correction unit".

Examples of the method for correcting a time synchronization message will be described below.

A time synchronization message includes a correction field. The correction field is used to suppress effect of variation of delay caused by queuing of transmission devices. The message correction unit 102 reads a value from the correction field of the time synchronization message and stores a value obtained by subtracting a difference value of reception time points stored in the difference storage unit 104 from the read value in the correction field of the time synchronization message to thereby correct the time synchronization message.

Another example of the method for correcting a time synchronization message is applicable to a case where a value stored in the difference storage unit 104 is a positive value, that is, a case where the time synchronization message arrives at a blocked port first when a difference value between reception time points of the time synchronization message is obtained before topology is changed. When detecting a time synchronization message which is to be corrected after the topology change, the message correction unit 102 stores the time synchronization message in a queue and performs time delay on the time synchronization message by a difference value stored in the difference storage unit 104 so as to correct the time synchronization message.

Figure 9:
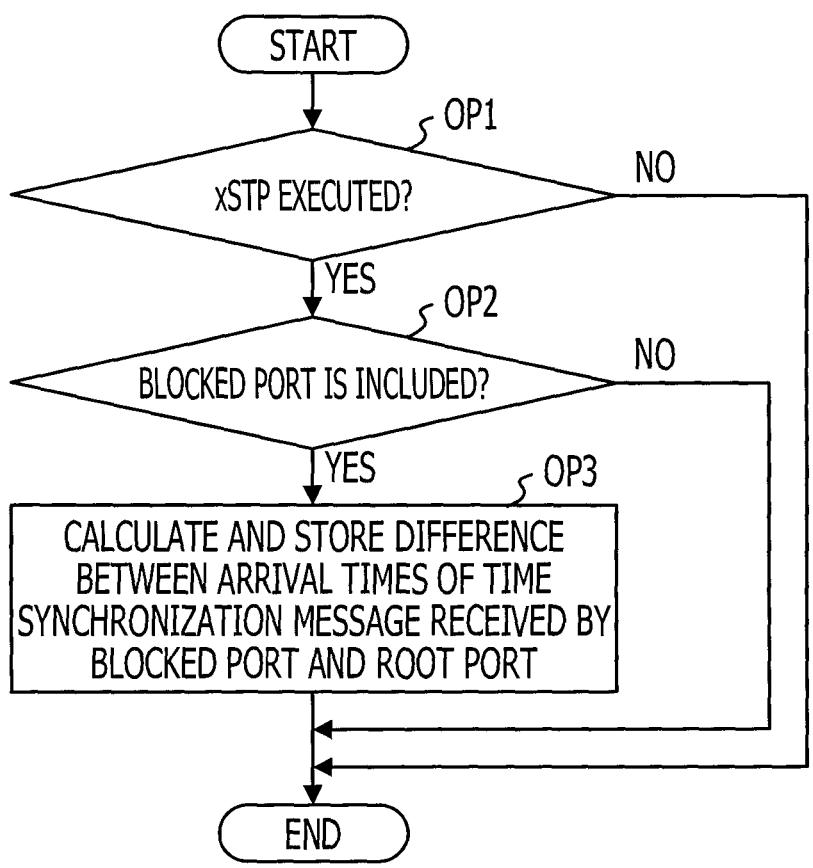
FIG. 9 is a flowchart illustrating a process of calculating a difference value of time points when a time synchronization message is received.

FIG. 9 is a flowchart illustrating a process of calculating a difference value between reception time points of a time synchronization message. The flowchart illustrated in FIG. 9 is performed when a time synchronization message is received for given cycles, for example.

In OP1, the difference calculation unit 103 determines whether the RSTP (represented by xSTP in FIG. 9) is executed. When the RSTP is executed (OP1: Yes), the process proceeds to OP2. When the RSTP is not executed (OP1: No), the process illustrated in FIG. 9 is terminated. The case where the RSTP is not executed includes a case where the RSTP is invalidated in the transmission device 100.

In OP2, the difference calculation unit 103 determines whether the transmission device 100 includes at least one blocked port. When the transmission device 100 includes at least one blocked port (OP2: Yes), the process proceeds to OP3. When a blocked port is not included (OP2: No), the process illustrated in FIG. 9 is terminated.

In OP3, the difference calculation unit 103 calculates a difference value between a time point when a time synchronization message is received by the blocked port and a time point when the time synchronization message is received by a root port, and stores the difference value in the difference storage unit 104. The difference value is calculated by subtracting the time point when the time synchronization message is received by the root port from the time point when the time synchronization message is received by the blocked port. Thereafter, the process illustrated in FIG. 9 is terminated.

Figure 10:
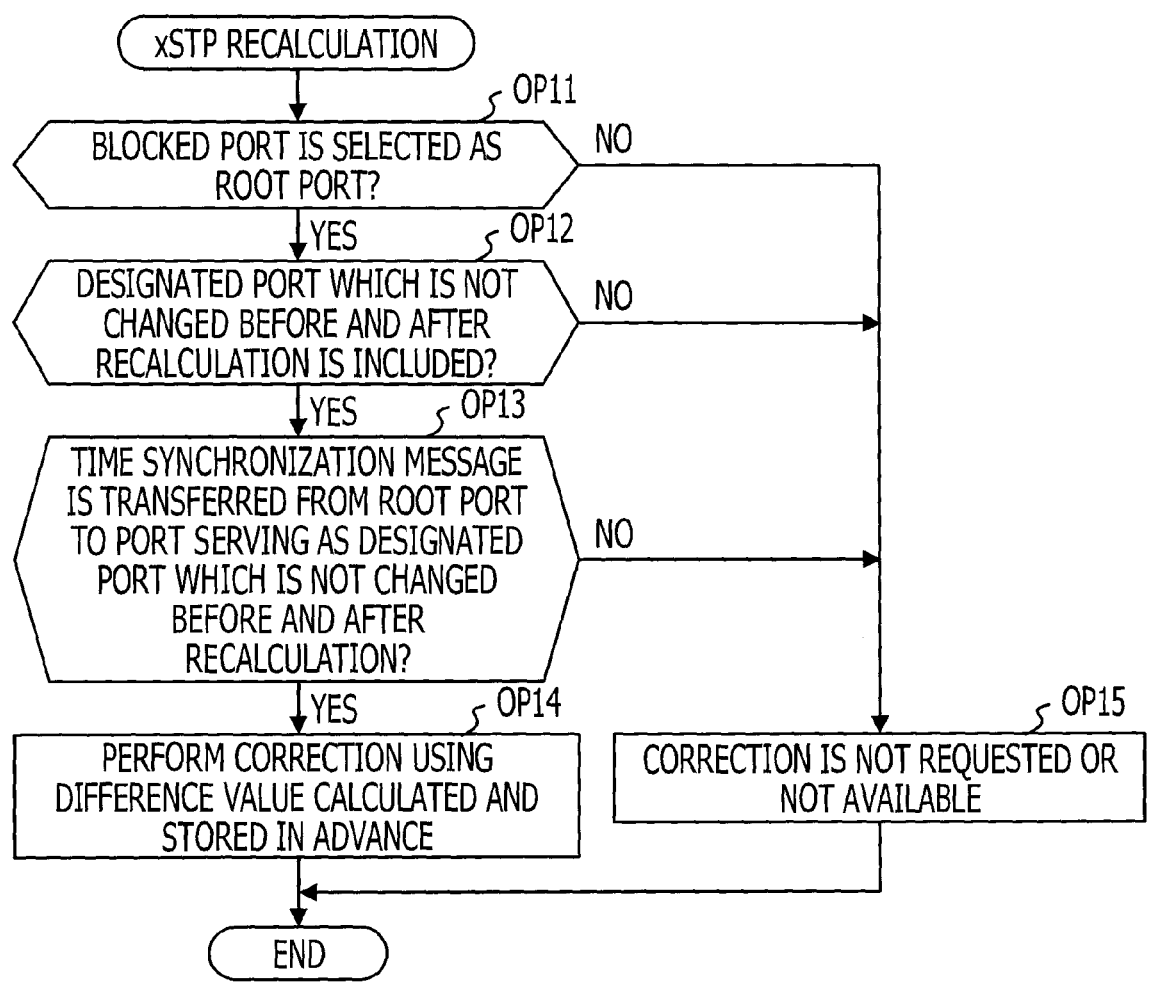
FIG. 10 is a flowchart illustrating a determination as to whether the time synchronization message is to be corrected and a correction process which are performed after topology is changed.

FIG. 10 is a flowchart illustrating a determination as to whether a time synchronization message is to be corrected and a correction process which are performed after topology is changed. The process illustrated in FIG. 10 is started after recalculation of the RSTP is terminated.

In OP11, the message correction controller 107 determines whether a blocked port is selected as a root port. For example, the message correction controller 107 stores transition of roles of ports input by the RSTP processor 106 in the memory and performs the determination above in accordance with the transition of the roles of the ports. When the blocked port is selected as a root port (OP11: Yes), the process proceeds to OP12. When the blocked port is not selected as a root port or when the transmission device 100 does not include a blocked port before the topology is changed (OP11: No), the process proceeds to OP15. In OP15, the message correction controller 107 determines that correction of the time synchronization message is not requested or not available. Thereafter, the process illustrated in FIG. 10 is terminated.

In OP12, the message correction controller 107 determines whether the transmission device 100 includes a designated port which is not changed before and after the recalculation of the RSTP. When the transmission device 100 includes a designated port which is not changed before and after the recalculation of the RSTP (OP12: Yes), the message correction controller 107 determines that the time synchronization message is to be corrected and issues an instruction for correcting the time synchronization message to the message correction unit 102 included in one of the IF cards 1 which has the designated port. Thereafter, the process proceeds to OP13. When the transmission device 100 does not include a designated port which is not changed before and after the recalculation of the RSTP (OP12: No), the process proceeds to OP15 where the message correction controller 107 determines that correction of the time synchronization message is not requested or not available. This is because the transmission device 100 does not calculate and store a difference between reception time points of the time synchronization message before the topology is changed. Thereafter, the process illustrated in FIG. 10 is terminated.

In OP13, the message correction unit 102 determines whether the time synchronization message is transferred from the port which is changed from the blocked port to the root port to the port which remains as the designated port before and after the recalculation. When the time synchronization message is transferred from the port which is changed from the blocked port to the root port to the port which remains as the designated port before and after the recalculation (OP13: Yes), the process proceeds to OP14. When the time synchronization message is not transferred from the port which is changed from the blocked port to the root port to the port which remains as the designated port before and after the recalculation (OP13: No), the process proceeds to OP15 where the message correction unit 102 determines that the correction of the time synchronization message is not requested or not available. Thereafter, the process illustrated in FIG. 10 is terminated.

In OP14, the message correction unit 102 corrects the time synchronization message using the difference value stored in the difference storage unit 104 and outputs the corrected time synchronization message. Thereafter, the process illustrated in FIG. 10 is terminated.

It is determined that the correction of the time synchronization message is not requested or not available in OP15 since it is highly likely that the transmission device 100 does not calculate and store the difference between reception time points of the time synchronization message before the topology is changed. In other words, it is highly likely that the transmission device 100 does not receive a time synchronization message by neither the blocked port nor the root port before the topology is changed. Alternatively, even when the transmission device 100 stores the difference between the reception time points of the time synchronization message, the transmission device 100 is not a junction point of time synchronization messages before and after the topology is changed.

For example, in the fourth bridge in the network before the failure occurs illustrated in FIG. 5, the RSTP is executed (OP1: Yes) and the transmission device 100 includes the first port which is blocked (OP2: Yes). In the fourth bridge, the zeroth port serving as the root port and the blocked first port receive a time synchronization message. Therefore, the fourth bridge calculates a difference value between a time point when the time synchronization message is received by the zeroth port serving as the root port and a time point when the time synchronization message is received by the blocked first port and stores the difference value (OP3). When failure occurs in the network and the network enters the state illustrated in FIG. 6, the blocked first port of the fourth bridge is changed to a root port (OP11: Yes) and the second port of the fourth bridge is selected as a designated port before and after the failure occurs (before and after recalculation of the RSTP) (OP12: Yes). Furthermore, in the fourth bridge, the time synchronization message is transferred from the first port which is changed from the blocked port to the root port to the second port selected as the designated port before and after the failure occurs (OP13: Yes). Therefore, the fourth bridge performs correction of the time synchronization message using the difference value stored in the difference storage unit 104 (OP14).

Next, operation of the sixth bridge including the first port which is in a blocked state will be described. As with the fourth bridge, the sixth bridge included in the network illustrated in FIG. 5 performs the RSTP (OP1: Yes) and has the blocked first port (OP2: Yes). In the sixth bridge, the zeroth port serving as the root port and the blocked first port receive a time synchronization message. Therefore, the sixth bridge calculates a difference value between a time point when the time synchronization message is received by the zeroth port serving as the root port and a time point when the time synchronization message is received by the blocked first port and stores the difference value (OP3). However, when network failure occurs and the network enters the state illustrated in FIG. 6, the blocked first port of the sixth bridge remains as the blocked state even after the failure occurs (after recalculation of the RSTP) (OP11: No). Therefore, in the sixth bridge, it is determined that correction of the time synchronization message is not requested or not available (OP15), and the correction of the time synchronization message is not performed. Although the sixth bridge stores the difference between reception time points of the time synchronization message when the failure occurs, the sixth bridge is not a junction point of routes of time synchronization messages before and after topology is changed. Therefore, the sixth bridge is not capable of detecting whether the route before the topology is changed and the route after the topology is changed is different from each other. Therefore, in the first embodiment, the correction of the time synchronization message is not performed in the sixth bridge included in the network illustrated in FIG. 6.

As described above, according to the first embodiment, the transmission devices included in the network perform the processes illustrated in FIGS. 9 and 10 so that one of the transmission devices serving as a junction point of time synchronization messages before and after the topology is changed performs correction of the time synchronization message. Since the time synchronization message is corrected after the topology is changed in the transmission device, occurrence of false recognition of a difference between the operation frequency of the slave clock included in the PTP slave and the operation frequency of the master clock included in the PTP master may be suppressed. As a result, unstable operation of the network caused by the change of the topology may be suppressed.

In the foregoing embodiment, the case where each of the transmission devices 100 included in the network executes the RSTP is described. However, the present disclosure is not limited to this and the technique described in the first embodiment is applicable to a case where each of the transmission devices 100 executes the STP or the MSTP.

Another embodiment of the present disclosure is a transmission method executed by the transmission devices described above. Furthermore, a further embodiment of the present disclosure includes a transmission program which causes a computer to function as the transmission device described above and a computer-readable recording medium which records the program. Examples of the computer-readable recording medium include recording mediums which electrically, magnetically, optically, mechanically, or chemically store information such as data and programs which are readable by a computer and the like.

According to the foregoing embodiment, influence of variation of transmission delay caused by change of a transmission route performed in accordance with change of topology of a network may be suppressed.

All examples and conditional language recited herein are intended for pedagogical purposes to aid the reader in understanding the invention and the concepts contributed by the inventor to furthering the art, and are to be construed as being without limitation to such For example recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission device comprising:
a memory which stores a program; and
a processor which executes, based on the program, a process including:
calculating a difference between a first time when a frame is received by a first port which is in a blocked state and a second time when the frame is received by a second port which is not in a blocked state, and
correcting a frame received after topology of a network is changed in accordance with states of the first and second ports after the topology is changed and the difference.

2. The transmission device according to claim 1, wherein the process includes:
determining whether the blocked state of the first port is cancelled and the first port is selected as a root port after the topology is changed,
determining whether a port selected as a designated port before and after the topology is changed exists, and
determining whether correction of the frame received after the topology is changed is available, and
wherein, when it is determined that the correction of the frame received after the topology is changed is available and the frame is transferred from the first port to the port selected as the designated port, the correction of the frame which is received after the topology is changed is performed.

3. The transmission device according to claim 1, wherein the correction of the frame received after the topology is changed is performed by adding the difference to a value of a correction field included in the frame.

4. The transmission device according to claim 1, wherein the correction is performed by delaying the frame received after the topology is changed by the difference.

5. The transmission device according to claim 1, wherein the blocked state represents a state in which the frame is not forwarded.

6. A transmission method, comprising:
calculating a difference between a first time when a frame is received by a first port which is in a blocked state and a second time when the frame is received by a second port which is not in a blocked state; and correcting a frame received after topology of a network is changed in accordance with states of the first and second ports after the topology is changed and the difference.

7. The transmission method according to claim 6 comprising:
   determining whether the blocked state of the first port is cancelled and the first port is selected as a root port after the topology is changed;
   determining whether a port selected as a designated port before and after the topology is changed exists; and
   determining whether correction of the frame received after the topology is changed is available,
   wherein, when it is determined that the correction of the frame received after the topology is changed is available and the frame is transferred from the first port to the port selected as the designated port, the correction of the frame which is received after the topology is changed is performed.

8. The transmission method according to claim 6,
   wherein the correction of the frame received after the topology is changed is performed by adding the difference to a value of a correction field included in the frame.

9. The transmission method according to claim 6,
   wherein the correction is performed by delaying the frame received after the topology is changed by the difference.

10. The transmission method according to claim 6,
    wherein the blocked state represents a state in which the frame is not forwarded.

11. A transmission device comprising:
    a first port;
    a second port; and
    a processor coupled to the first port and the second port, wherein the processor is configured to:
      calculate a difference between a first time when a first frame is received by the first port which is in a blocked state with regard to a certain frame and a second time when a second frame is received by the second port which is not in a blocked state with regard to the certain frame; and
      perform correction for a frame received after topology of a network is changed in accordance with states of the first and second ports after the topology is changed and the difference.

12. The transmission device according to claim 11,
    wherein the processor is configured to:
      determine whether the blocked state of the first port is cancelled and the first port is selected as a root port after the topology is changed;
      determine whether a port selected as a designated port before and after the topology is changed exists; and
      determine whether correction of the frame received after the topology is changed is available, and
    wherein, when it is determined that the correction of the frame received after the topology is changed is available and the frame is transferred from the first port to the port selected as the designated port, the correction of the frame which is received after the topology is changed is performed.

13. The transmission device according to claim 11,
    wherein the correction of the frame received after the topology is changed is performed by adding the difference to a value of a correction field included in the frame.

14. The transmission device according to claim 11,
    wherein the correction is performed by delaying the frame received after the topology is changed by the difference.

15. The transmission device according to claim 11,
    wherein the blocked state represents a state in which the frame is not forwarded.

* * * * *